US012482577B2

(12) United States Patent
Crabbe

(10) Patent No.: US 12,482,577 B2
(45) Date of Patent: Nov. 25, 2025

(54) APPARATUS AND METHOD

(71) Applicant: Lead Technologies Limited, Barnsley (GB)

(72) Inventor: Ian Crabbe, Barnsley (GB)

(73) Assignee: LEAD TECHNOLOGIES LIMITED, Barnsley (GB)

( * ) Notice: Subject to any disclaimer, the term of this patent is extended or adjusted under 35 U.S.C. 154(b) by 1015 days.

(21) Appl. No.: 17/440,492

(22) PCT Filed: Apr. 15, 2020

(86) PCT No.: PCT/GB2020/050952
§ 371 (c)(1),
(2) Date: Sep. 17, 2021

(87) PCT Pub. No.: WO2020/212693
PCT Pub. Date: Oct. 22, 2020

(65) Prior Publication Data

US 2022/0181040 A1 Jun. 9, 2022

(30) Foreign Application Priority Data

Apr. 15, 2019 (GB) .................................... 1905321

(51) Int. Cl.
*G21F 9/00* (2006.01)
*G21F 9/30* (2006.01)

(52) U.S. Cl.
CPC .............. *G21F 9/004* (2013.01); *G21F 9/308* (2013.01)

(58) Field of Classification Search
CPC . G21F 9/004; G21F 9/308; G21F 9/30; B22D 11/206; G01T 1/167; G01N 33/02
(Continued)

(56) References Cited

U.S. PATENT DOCUMENTS 3,537,505 A * 11/1970 Moser .................. B22D 11/148 164/413
3,884,288 A * 5/1975 Berry ................. B22D 11/0602 164/450.2

(Continued)

FOREIGN PATENT DOCUMENTS

CN 103811091 B 10/2016
GB 1293939 A 10/1972

(Continued)

OTHER PUBLICATIONS

JPH07174755, Suzuki et al. , Measuring Device For Radiation of Solidified Analyzing Sample of Molten Metal, Jul. 14, 1995 (Year: 1995).*

(Continued)

*Primary Examiner* — Jessee R Roe
*Assistant Examiner* — Michael Aboagye
(74) *Attorney, Agent, or Firm* — FOX ROTHSCHILD LLP

(57) ABSTRACT

An apparatus (10) is described for removing radioactive contamination, at least in part, from a first article (A1) comprising a metal, preferably wherein the metal comprises and/or is a low melting point metal for example lead and/or an alloy thereof. The apparatus (10) comprises a heated first vessel (100A) for melting the metal, at least in part, therein, thereby providing a melt (M) therefrom. The apparatus (10) comprises casting means (200) for forming a second article (A2), particularly a sheet, having a predetermined thickness (T), from the melt, preferably wherein the casting means (200) comprises and/or is a rotatable roller (210) arrangeable to contact the melt (M) to thereby form thereon the second article (A2) and a guide (220) arranged to remove the second article (A2) from the roller (210). The apparatus (10) comprises a set of radiation detectors (300), including a first radiation detector (300A), arranged to detect a first fraction
(Continued)

of the radioactive contamination, if present, in a first part (P1) of a set of parts of the second article (A2), preferably wherein the set of radiation detectors (300) comprises opposed first and second radiation detectors (300A, 300B) arranged to receive the second article (A2) traversing therebetween. The apparatus (10) comprises a cutter (400) arrangeable to excise the first part (P1) of the second article (A2) therefrom.

12 Claims, 10 Drawing Sheets

(58) Field of Classification Search
USPC ............................ 266/236; 164/413, 450.2
See application file for complete search history.

(56) References Cited

U.S. PATENT DOCUMENTS 3,926,247 A * 12/1975 Geiger .................. B22D 25/04 164/415
5,462,109 A * 10/1995 Vincze .................. B22D 25/04 164/489
5,948,566 A * 9/1999 Larsen ................ B22D 11/0611 29/623.5
8,796,500 B2 * 8/2014 Cho ........................ C03B 5/021 588/901
2013/0296628 A1 11/2013 Cho et al.

FOREIGN PATENT DOCUMENTS

JP S61239198 A 10/1986
JP H07174755 * 7/1995 ............. G01T 1/167
WO 9407629 A1 4/1994

OTHER PUBLICATIONS

Vitaly Sobolev (2011) Database of thermophysical properties of liquid metal coolants for GEN-IV: Sodium, lead, lead-bismuth eutectic (and bismuth), Nov. 2010 (rev. Dec. 2011).
International Search Report mailed on Jul. 16, 2020 in PCT/GB2020/050952.

* cited by examiner

APPARATUS AND METHOD

CROSS REFERENCE TO RELATED APPLICATIONS

This application is a § 371 national phase entry of International Patent Application No. PCT/GB2020/050952, filed Apr. 15, 2020, which claims priority to and the benefit of Great Britain Patent Application No. 1905321.4 filed on Apr. 15, 2019, the disclosures of which are hereby incorporated herein by reference in their entireties.

FIELD

The present invention relates to an apparatus for, and a method of, removing radioactive contamination from a first article comprising a metal, preferably wherein the metal comprises and/or is a low melting point metal for example lead and/or an alloy thereof.

BACKGROUND TO THE INVENTION

Lead and/or alloys thereof (hereinafter referred to as lead) is typically used for nuclear shielding, to shield personnel and/or resources from sources of particularly β and γ radiation. Lead is also effective for shielding neutron flux produced during fission. Hence, lead shielding (i.e. lead articles) is typically used in nuclear fuel processing and reprocessing plants, in nuclear power stations, in weapons manufacture and in nuclear research and test facilities, amongst others. For example, lead castles are structures composed of interlocking lead bricks, typically Pb—4 wt. % Sb, used to enclose sources of radiation. Lead shielding is also provided in different forms, typically custom, such as tubular, plate, sheet, bar, granular or shot, powder, thread and foil. Lead shielding may also be coated. Further, lead may be used as holders or housings for radiation sources. In addition, lead and/or alloys thereof is used in other lead articles for other applications in the nuclear industry, such as sheathing for cables and pipework, or as a coating for, and/or another part of, other metallic components.

In use, however, radioactive contamination collects on surfaces (i.e. surface contamination) of these lead articles, for example as particulates, and may become embedded in the surfaces. A problem arises when decommissioning, dismantling and/or demolition of such lead articles. However, surface contamination may be readily detected and thus remedial action taken to decontaminate the articles.

A further problem arises when, for historical reasons, lead articles having surface contamination have been remelted to form recycled lead articles, without sufficient prior surface decontamination. The surface contamination is thus incorporated internally into the recycled lead alloys. In contrast to surface contamination, sub-surface (i.e. internal) radioactive contamination can generally not be readily detected. Particularly, the shielding provided by the lead masks encapsulated radionuclides and precludes detection of most such sub-surface radioactive contamination, such that these recycled lead articles are effectively indistinguishable from virgin lead articles (i.e. formed from uncontaminated lead) in terms of measurable radioactive contamination. These recycled lead articles may be also subsequently remelted, in turn, after use. This problem may be further exacerbated by a lack of historic traceability of such recycled lead articles.

Accurate assays (i.e. processes) which seek to mitigate such problems are further complicated by the variety of sizes and shapes the articles may take. Such variations result in measurement (i.e. detection) uncertainties, both in modelling and post-processing leading to results which have large margins for error and are, as a result, unrealistically conservative.

Thus, a particular problem arises when decommissioning, dismantling and/or demolition of such lead articles, which may include recycled lead articles. Since radioactive contamination of these lead articles may not be reliably assessed, for example quantified, these lead articles are typically categorized as Higher Activity Waste (HAW), for example Intermediate Level Waste, rather than Low Level Waste (LLW) or even Very Low Level Waste (VLLW). LLW contains relatively low levels of radioactivity, not exceeding 4 gigabecquerel (GBq) per tonne of alpha activity, or 12 GBq per tonne of beta/gamma activity. ILW exceeds the upper boundaries for Low Level Waste but does not generate a significant amount of heat. A cost and complexity of processing, for example handling and/or storing, such waste increases almost exponentially with the categorization. For example, relative costs of processing are about 10:100:1000:10000 for VLLW:LLW:ILW:HLW, respectively. Hence, by categorizing these lead articles as ILW, for example, the cost and complexity of processing are almost exponentially increased while recycling of the lead is generally precluded.

Hence, there is a need to improve processing of such lead articles.

SUMMARY OF THE INVENTION

It is one aim of the present invention, amongst others, to provide an apparatus for, and a method of, detecting and removing radioactive contamination from a first article comprising a metal which at least partially obviates or mitigates at least some of the disadvantages of the prior art, whether identified herein or elsewhere. For instance, it is an aim of embodiments of the invention to provide an apparatus for removing radioactive contamination, at least in part, from a first article, thereby providing a second article having a lower level of, preferably minimal or zero, radioactive contamination. For instance, it is an aim of embodiments of the invention to provide a method of removing radioactive contamination, at least in part, from a first article that enables recycling of low melting point metals and/or reduces a cost and/or a complexity of processing of the first article.

A first aspect provides an apparatus for removing radioactive contamination, at least in part, from a first article comprising a metal, preferably wherein the metal comprises and/or is a low melting point metal for example lead and/or an alloy thereof, the apparatus comprising:

a heated first vessel for melting the metal, at least in part, therein, thereby providing a melt therefrom;

casting means for forming a second article, for example a sheet, a strip or a ribbon, having a predetermined thickness, from the melt, preferably wherein the casting means comprises and/or is a rotatable roller arrangeable to contact the melt to thereby form thereon the second article and a guide arranged to remove the second article from the roller;

a set of radiation detectors, including a first radiation detector, arranged to detect a first fraction of the radioactive contamination, if present, in a first part of a set of parts of the second article, preferably wherein the set of radiation detectors comprises opposed first and second radiation detectors arranged to receive the second article traversing therebetween; and a cutter arrangeable to excise the first part of the second article therefrom.

A second aspect provides a method of removing radioactive contamination, at least in part, from a first article comprising a metal, preferably wherein the metal comprises and/or is a low melting point metal for example lead and/or an alloy thereof, the method comprising:

- melting the metal, at least in part, thereby providing a melt therefrom;
- forming a second article, for example a sheet, a strip or a ribbon, having a predetermined thickness, from the melt, preferably by contacting the melt with a rotating roller and removing therefrom the second article formed thereon;
- detecting a first fraction of the radioactive contamination, if present, in a first part of a set of parts of the second article, preferably using a set of radiation detectors, including a first radiation detector, preferably by receiving the second article traversing between opposed first and second radiation detectors of the set of radiation detectors; and
- excising the detected first fraction of the radioactive contamination, if present, from the second article, for example by cutting, the first part of the second article therefrom.

DETAILED DESCRIPTION OF THE INVENTION

According to the present invention there is provided an apparatus for, and a method of, detecting and removing radioactive contamination from a first article comprising a metal, as set forth in the appended claims. Other features of the invention will be apparent from the dependent claims, and the description that follows.

Apparatus

The first aspect provides an apparatus for removing radioactive contamination, at least in part, from a first article comprising a metal, preferably wherein the metal comprises and/or is a low melting point metal for example lead and/or an alloy thereof, the apparatus comprising:

- a heated first vessel for melting the metal, at least in part, therein, thereby providing a melt therefrom;
- casting means for forming a second article, for example a sheet, a strip or a ribbon, having a predetermined thickness, from the melt, preferably wherein the casting means comprises and/or is a rotatable roller arrangeable to contact the melt to thereby form thereon the second article and a guide arranged to remove the second article from the roller;
- a set of radiation detectors, including a first radiation detector, arranged to detect a first fraction of the radioactive contamination, if present, in a first part of a set of parts of the second article, preferably wherein the set of radiation detectors comprises opposed first and second radiation detectors arranged to receive the second article traversing therebetween; and
- a cutter arrangeable to excise the first part of the second article therefrom.

In this way, the low melting point metal of the first article is formed into the second article, having the predetermined thickness (i.e. a controlled dimension). The pre-determined thickness allows through-thickness (i.e. volumetric) detection of the first fraction of the radioactive contamination, if present. In contrast, through-thickness detection of radioactive contamination therein is generally not possible. Hence, by melting the metal and forming the second article therefrom, the radioactive contamination that was internal and undetectable in the first article is now detectable in the second article, by virtue of the predetermined thickness thereof. If the first fraction of the radioactive contamination is detected, the first part of the second article, including the first fraction of the radioactive contamination, is excised, such that the remaining part of the second article has proportionately less radioactive contamination. Hence, by detecting and excising the fractions of the radioactive contamination present in the second article, the residual radioactive contamination therein is reduced. The first part of the second article may be categorized as Higher Activity Waste (HAW), for example Intermediate Level Waste, for subsequent processing. In contrast, the remaining part of the second article may be instead categorized as only Low Level Waste (LLW), even Very Low Level Waste (VLLW) or may be recycled. The amount of the second article that is excised will depend, at least in part, on the amount of radioactive contamination present in the first article.

Particularly, the apparatus and method provide the ability to reduce an inventory of waste first articles and allow reuse of the clean(ed) metal, thereby turning a financial and/or environmental liability (for example, contaminated lead requiring management and storage) into an asset (for example, lead that has been assayed which can be reused such as recycled or potentially sold to third parties). Simply put, lead that currently costs the proprietor thousands of pounds to store, may either be safely recycled for re-use or potentially be free released and sold, thereby saving and/or making money.

The apparatus is for removing the radioactive contamination from the first article comprising the metal.

Radioactive Contamination

The radioactive contamination may be present as particulates, for example, in the first article. Such particulates may arise as dust, for example from scale (i.e. corrosion products), or from other sources, such as by direct or indirect transfer, including from fissile material and/or decay products thereof.

Particularly, radioactive contaminants present may be wide ranging depending upon the source of the first articles, for example shielding bricks. In old laboratories, such bricks are likely to have been exposed to everything from old fuel, to R&D products, to more recent samples from Advanced Gas Cooled Reactors (AGRs) or the like. Old operating plants may be less varied, as they typically only deal with one process, but more esoteric.

Radionuclides may include fissile U and/or Pu isotopes as well as radionuclides of H, C, Fe, Mn, Co, Sr, Ag and/or Ag, for example. The radioactive contamination due to these radionuclides may have activities ranging from background to >1 E-4 C, for example. Surface radioactive contamination of the first article may range from non-detectable to >10E4 counts per 100 $cm^2$, for example. The surface radioactive contamination may be fixed or smearable i.e. transferable.

Metal

In one example, the metal comprises and/or is a low melting point metal for example lead and/or an alloy thereof. In one example, the metal comprises and/or is a low melting point metal for example bismuth, lead, tin, cadmium, zinc, indium, thallium and/or an alloy thereof. In one example, the metal comprises and/or is a fusible alloy.

In one example, the metal has a melting point in a range from 50° C. to 600° C., preferably in a range from 100° C. to 500° C., more preferably in a range 150° C. to 450° C., most preferably in a range from 200° C. to 425° C., for example 225° C., 250° C., 275° C., 325° C., 350° C., 400° C. or 425° C.

TABLE 1

| Melting points of low melting point metals. | | |
|---|---|---|
| Element or alloy (composition in wt. %) | Melting point | Eutectic? |
| Bi 40.3, Pb 22.2, In 17.2, Sn 10.7, Cd 8.1, TI 1.1 | 41.5° C. | yes |
| Bi 40.63, Pb 22.1, In 18.1, Sn 10.65, Cd 8.2 | 46.5° C. | |
| Bi 44.7, Pb 22.6, In 19.1, Cd 5.3, Sn 8.3 | 47° C. | yes |
| Bi 49, Pb 18, In 21, Sn 12 | 58° C. | |
| Bi 32.5, In 51.0, Sn 16.5 | 60.5° C. | yes |
| K 100 | 63.5° C. | (yes) |
| Bi 50, Pb 26.7, Sn 13.3, Cd 10 | 70° C. | yes |
| Bi 49.5, Pb 27.3, Sn 13.1, Cd 10.1 | 70.9° C. | yes |
| Bi 50.0, Pb 25.0, Sn 12.5, Cd 12.5 | 71° C. | yes |
| In 66.3, Bi 33.7 | 72 | yes |
| Bi 42.5, Pb 37.7, Sn 11.3, Cd 8.5 | 74° C. | no |
| Bi 56, Sn 30, In 14 | 79-91° C. | no |
| Bi 50, Pb 30, Sn 20, Impurities | 92° C. | no |
| Bi 52.5, Pb 32.0, Sn 15.5 | 95° C. | yes |
| Bi 52, Pb 32.0, Sn 16 | 96° C. | yes |
| Bi 50.0, Pb 31.2, Sn 18.8 | 97° C. | no |
| Na 100 | 97.8 | (yes) |
| Bi 50.0, Pb 28.0, Sn 22.0 | 94-98° C. | no |
| Bi 56.5, Pb 43.5 | 125° C. | yes |
| Bi 58, Sn 42 | 138° C. | yes |
| Bi 57, Sn 43 | 139 | yes |
| In 100 | 157° C. | (yes) |
| Li 100 | 180.5° C. | (yes) |
| Sn 62.3, Pb 37.7 | 183° C. | yes |
| Sn 63.0, Pb 37.0 | 183° C. | no |
| Sn 91.0, Zn 9.0 | 198° C. | yes |
| Sn 92.0, Zn 8.0 | 199° C. | no |
| Sn 100 | 231.9° C. | (yes) |
| Bi 100 | 271.5° C. | (yes) |
| TI 100 | 304° C. | (yes) |
| Cd 100 | 321.1° C. | (yes) |
| Pb 100 | 327.5° C. | (yes) |
| Zn 100 | 419.5° C. | (yes) |

In one example, the metal comprises Pb in an amount of at least 75 wt. %, preferably at least 80 wt. %, more preferably at least 85 wt. %, most preferably at least 90 wt. %, as described below in more detail.

In one example, the metal consists of:

Ag in an amount from 0.0 to 2 wt. %, preferably 0.1 to 1.75 wt. %, more preferably from 0.25 to 1.5 wt. %, most preferably from 0.5 to 1.0 wt. %;

Ca in an amount from 0.0 to 1 wt. %, preferably 0.01 to 0.50 wt. %, more preferably from 0.02 to 0.25 wt. %, most preferably from 0.03 to 0.15 wt. %;

Sb in an amount from 0.0 to 25 wt. %, preferably from 0.25 to 15 wt. %, more preferably from 1 to 10 wt. %, most preferably 2 to 6 wt. %;

Sn in an amount from 0.0 to 25 wt. %, preferably from 1 to 20 wt. %, more preferably from 2 to 15 wt. %, most preferably 5 to 10 wt. %; and balance Pb and unavoidable impurities, as described below in more detail.

Grades of Lead

Grades are pure lead (also called corroding lead) and common lead (both containing 99.94% min lead), and chemical lead and acid-copper lead (both containing 99.90% min lead). Lead of higher specified purity (99.99%) is also available in commercial quantities. Specifications other than ASTM B 29 for grades of pig lead include federal specification QQ-L-171, German standard DIN 1719, British specification BS 334, Canadian Standard CSA-HP2, and Australian Standard 1812.

Corroding lead: Most lead produced in the United States is pure (or corroding) lead (99.94% min Pb). Corroding lead which exhibits the outstanding corrosion resistance typical of lead and its alloys. Corroding lead is used in making pigments, lead oxides, and a wide variety of other lead chemicals.

Chemical lead: Refined lead with a residual copper content of 0.04 to 0.08% and a residual silver content of 0.002 to 0.02% is particularly desirable in the chemical industries and thus is called chemical lead.

Copper-bearing lead provides corrosion protection comparable to that of chemical lead in most applications that require high corrosion resistance. Common lead, which contains higher amounts of silver and bismuth than does corroding lead, is used for battery oxide and general alloying.

TABLE 1

| Compositions (wt. %) of pure lead according to BS EN 12659:1999. | | | |
|---|---|---|---|
| Indicative Lead Content | 99.970 Material No. PB970R | 99.985 Material No. PB985R | 99.990 Material No. PB990R |
| Ag | 0.0050 maximum | 0.0025 maximum | 0.0015 maximum |
| As | 0.0010 maximum | 0.0005 maximum | 0.0005 maximum |
| Bi | 0.030 maximum | 0.0150 maximum | 0.0100 maximum |
| Cd | 0.0010 maximum | 0.0002 maximum | 0.0002 maximum |
| Cu | 0.0030 maximum | 0.0010 maximum | 0.0005 maximum |
| Ni | 0.0010 maximum | 0.0005 maximum | 0.0002 maximum |
| Sb | 0.0010 maximum | 0.0005 maximum | 0.0005 maximum |
| Sn | 0.0010 maximum | 0.0005 maximum | 0.0005 maximum |
| Zn | 0.0005 maximum | 0.0002 maximum | 0.0002 maximum |
| Total alloying content | 0.030 | 0.015 | 0.010 |

TABLE 2

| Compositions (wt. %) of pure lead ingots according to GB/T 469-2013. | | | | |
|---|---|---|---|---|
| Pb no less than | 99.970 Code No. Pb99.970 | 99.985 Code No. Pb99.985 | 99.990 Code No. Pb99.990 | 99.994 Code No. Pb99.994 |
| Ag | 0.0050 maximum | 0.0025 maximum | 0.0015 maximum | 0.0008 maximum |
| As | 0.0010 maximum | 0.0005 maximum | 0.0005 maximum | 0.0005 maximum |
| Bi | 0.030 maximum | 0.015 maximum | 0.010 maximum | 0.004 maximum |
| Cd | 0.0010 maximum | 0.0002 maximum | 0.0002 maximum | 0.0002 maximum |
| Cu | 0.003 maximum | 0.001 maximum | 0.001 maximum | 0.001 maximum |
| Fe | 0.0020 maximum | 0.0010 maximum | 0.0010 maximum | 0.0005 maximum |

TABLE 2-continued

| Compositions (wt. %) of pure lead ingots according to GB/T 469-2013. | | | | |
|---|---|---|---|---|
| Pb no less than | 99.970 Code No. Pb99.970 | 99.985 Code No. Pb99.985 | 99.990 Code No. Pb99.990 | 99.994 Code No. Pb99.994 |
| Ni | 0.0010 maximum | 0.0005 maximum | 0.0002 maximum | 0.0002 maximum |
| Sb | 0.0010 maximum | 0.0008 maximum | 0.0008 maximum | 0.0007 maximum |
| Sn | 0.0010 maximum | 0.0005 maximum | 0.0005 maximum | 0.0005 maximum |
| Zn | 0.0005 maximum | 0.0004 maximum | 0.0004 maximum | 0.0004 maximum |
| Total | 0.030 maximum | 0.015 maximum | 0.010 maximum | 0.006 maximum |

TABLE 3

| Compositions (wt. %) of refined lead according to ASTM B29-03 (2014). | | |
|---|---|---|
| | Lead (min) by difference | |
| | 99.97 UNS No. L50021 | 99.995 UNS No. L50006 |
| | Grade | |
| | Refined Pure Lead | Low Bismuth Low Silver Pure Lead |
| Ag | 0.0075 maximum | 0.0010 maximum |
| Al | 0.0005 maximum | 0.0005 maximum |
| As | 0.0005 maximum | 0.0005 maximum |
| Bi | 0.025 maximum | 0.0015 maximum |
| Cd | 0.0005 maximum | 0.0005 maximum |
| Cu | 0.0010 maximum | 0.0010 maximum |
| Fe | 0.001 maximum | 0.0002 maximum |
| Ni | 0.0002 maximum | 0.0002 maximum |
| S | 0.001 maximum | 0.001 maximum |
| Sb | 0.0005 maximum | 0.0005 maximum |
| Se | 0.0005 maximum | 0.0005 maximum |
| Sn | 0.0005 maximum | 0.0005 maximum |
| Te | 0.0002 maximum | 0.0001 maximum |
| Zn | 0.001 maximum | 0.0005 maximum |

Lead-Base Alloys

Since lead is very soft and ductile, lead is normally alloyed. Antimony, tin, arsenic, and calcium are the most common alloying elements.

Antimony: Provides hardness, rigidity and resistance to curling or sagging and is used whenever strength is required. High antimony contents, however, tend to produce excessive surface scale and a less than optimum trivalent control. Antimony has a density of 0.24 lbs. per cubic inch and a melting temperature of 1170 degrees F. Antimony generally is used to give greater hardness and strength, as in storage battery grids, sheet, pipe, and castings. Antimony contents of lead-antimony alloys can range from 0.5 to 25%, but they are usually 2 to 5%.

Tin: Adding tin to lead or lead alloys increases hardness and strength, but lead-tin alloys are more commonly used for their good melting, casting, and wetting properties, as in type metals and solders. Tin gives the alloy the ability to wet and bond with metals such as steel and copper; unalloyed lead has poor wetting characteristics. Tin combined with lead and bismuth or cadmium forms the principal ingredient of many low-melting alloys. Provides improved corrosion resistance and conductivity, reduces surface scaling and improves trivalent control. Used primarily in high fluoride baths. Tin has a density of 0.26 lbs. per cubic inch and a melting temperature of 450 degrees F.

Silver: A small amount of silver (0.5-1 wt. %) greatly extends the corrosion resistance and increases the conductivity. Due to the additional cost, this is used only where an extended anode life is required such as in very high fluoride baths.

Lead-calcium alloys have replaced lead-antimony alloys in a number of applications, in particular, storage battery grids and casting applications. These alloys contain 0.03 to 0.15% Ca. More recently, aluminum has been added to calcium-lead and calcium-tin-lead alloys as a stabilizer for calcium. Silver, bismuth and some alkaline earth metals are also added to lead-calcium alloys to improve the alloy properties and the battery performance.

Arsenical lead (UNS L50310) is used for cable sheathing. Arsenic is often used to harden lead-antimony alloys and is essential to the production of round dropped shot.

Compositions: Designations

TABLE 4

| Designations of compositions of lead and lead-base alloys according to Unified Numbering System (UNS) designation. | |
|---|---|
| Lead and lead-base alloys | Unified Numbering System (UNS) designation |
| Pure leads | L50000-L50099 |
| Lead - silver alloys | L50100-L50199 |
| Lead - arsenic alloys | L50300-L50399 |
| Lead - barium alloys | L50500-L50599 |
| Lead - calcium alloys | L50700-L50899 |
| Lead - cadmium alloys | L50900-L50999 |
| Lead - copper alloys | L51100-L51199 |
| Lead - indium alloys | L51500-L51599 |
| Lead - lithium alloys | L51700-L51799 |
| Lead - antimony alloys | L52500-L53799 |
| Lead - tin alloys | L54000-L55099 |
| Lead - strontium alloys | L55200-L55299 |

Thermophysical Properties of Liquid Pb

Lead has a latent heat of fusion of 4.77 $kJ \cdot mol^{-1}$. In contrast, iron has a latent heat of fusion of 13.81 $kJ \cdot mol^{-1}$ (i.e. about three times greater) while aluminium has a latent heat of fusion of 10.71 $kJ \cdot mol^{-1}$ (i.e. more than two times greater).

The melting point of lead, about 327.5° C. (621.5° F.), is very low compared to most metals. In contrast, aluminium has a melting point of 660.32° C. (1220.58° F.) and iron has a melting point of 1538° C. (2800° F.). The boiling point of lead of 1749° C. (3180° F.) is the lowest among the carbon group elements.

The density of liquid lead at its melting point is about 10.66 $g \cdot cm^{-3}$ (i.e. a reduction of about 6%). In contrast, the density of liquid iron at its melting point is about 6.98 $g \cdot cm^{-3}$ (i.e. a reduction of about 11%) and the density of liquid aluminium at its melting point is about 2.375 $g \cdot cm^{-3}$ (i.e. a reduction of about 12%).

Thermophysical properties of liquid Pb are detailed in Vitaly Sobolev (2011) Database of thermophysical properties of liquid metal coolants for GEN-IV: Sodium, lead, lead-bismuth eutectic (and bismuth), November 2010 (rev. December 2011), SCK•CEN-BLG-1069 and summarized below.

Melting Point of Pb and Pb Alloys

The most probable value for the melting temperature $T_{M,0(Pb)}$ of technically pure lead is:

$$T_{M,0(Pb)}=600.6\pm0.1\ K=327.4\pm0.1°\ C.$$

Similar to the majority of metals with the face centred cubic crystal structure, lead exhibits a volume increase upon melting. At normal conditions, a volume increase of 3.81% has been observed in pure lead. In several engineering handbooks, a value of ~3.6% is often given for lead of technical purity.

FIG. 1 shows the melting point of binary Pb alloys as a function of the content of alloying additions of Sn, Bi, Te, Ag, Na, Cu and Sb. For relatively low alloying additions (up to 10 wt. %), common alloying additions Sn, Bi and Sb depress the relatively low melting point of pure lead.

Viscosity of Pb and Pb Alloys

Accurate and reliable data on viscosity of liquid metals are not abundant. Some discrepancies between experimental data can be attributed to a high reactivity of LM, to the difficulty of taking precise measurements at elevated temperatures, and to a lack of rigorous formulae for calculations. All considered liquid metals and alloys thereof are believed to be Newtonian liquids. The temperature dependence of their dynamic viscosity η is often described by an Arrhenius type equation:

$$\eta = \eta_0 \exp\left(\frac{E_\eta}{RT}\right)$$

where $E_\eta$ is the activation energy of motion for viscous flow and the other terms have their usual meanings.

FIG. 2 shows the dynamic viscosity $\eta_{Pb}$ of technically pure liquid lead as a function of temperature from $T_{M,0(Pb)}$ to 1470 K (1197° C.). From values in the literature, a reliable choice of an empirical equation to describe the temperature dependence of the dynamic viscosity $\eta_{Pb}$ of technically pure liquid lead can be obtained by fitting the selected values into the Arrhenius type equation of the form:

$$\eta_{Pb} = 4.55 \times 10^{-4} \exp\left(\frac{1069}{T}\right)$$

This correlation is valid in the temperature range from $T_{M,0(Pb)}$ to 1470 K (1197° C.).

Surface Tension of Pb and Pb Alloys

A surface tension of liquid surfaces σ is related to tendency to minimise their surface energy. The surface tension decreases with temperature and reduces to zero at the critical temperature $T_c$, where difference disappears between liquid and gas phases. According to Eotvos' law for normal liquids, this behaviour can be described by formula:

$$\sigma(T)=k_\sigma V_\mu^{-2/3}(T_c-T)$$

where $V_\mu$ is the molar volume. The average value of the constant $k_\sigma$ for the normal liquid metals is $6.4\times10^{-8}$ J $m^{-2}$ $K^{-1}$ $m^{2/3}$ $mol^{-2/3}$.

FIG. 3 shows the surface tension of liquid lead as a function of temperature from $T_{M,0(Pb)}$ to 1300 K (1027° C.). A linear correlation from $T_{M,0(Pb)}$ to 1300 K (1027° C.) is $$\sigma_{Pb}[Nm^{-1}]=(525.9-0.113T)\times10^{-3}$$

Heated First Vessel

The apparatus comprises the heated first vessel (also known as a bath or a pot) for melting the metal, at least in part, therein, thereby providing the melt therefrom.

In one example, the first vessel is heated resistively (i.e. using electrical heaters) and/or using gas burners and/or oil burners.

In one example, the heated first vessel is arranged to heat the metal to a temperature in a range from 0° C. to 500° C., preferably in a range from 25° C. to 300° C., more preferably in a range from 50° C. to 200° C., most preferably in a range from 80° C. to 130° C. above the melting point of the metal. In one example, the heated first vessel is arranged to heat the metal to a temperature in a range from 100° C. to 800° C., preferably in a range from 200° C. to 700° C., more preferably in a range from 250° C. to 600° C., most preferably in a range from 300° C. to 450° C., for example 380° C. In one example, the apparatus comprises a thermocouple and a heating controller, arranged to control a temperature of the first vessel. It should be understood that the temperature is relatively low, for example below usual temperatures for removing radioactive contamination by chemical reaction, as described below in more detail.

In one example, the metal has a melting point in a range from 100° C. to 600° C., preferably in a range from 150° C. to 500° C., more preferably in a range 250° C. to 450° C., most preferably in a range from 275° C. to 400° C., for example 300° C., 325° C., 350° C., 400° C. or 425° C.

In one example, the heated first vessel has a capacity in a range from 0.1 $m^3$ to 1 $m^3$, preferably in a range from 0.15 $m^3$ to 0.75 $m^3$, more preferably in a range from 0.25 $m^3$ to 0.5 $m^3$. That is, the capacity is relatively small. In this way, relatively small batches of the metal are melted, thereby improving control.

In one example, the apparatus is arranged to drain a heel (i.e. heavy impurities) from the bottom of the melt in the first vessel, for example by comprising an outlet proximal the base thereof. In one example, the apparatus is arranged to collect dross (i.e. light impurities, for example, oxide inclusions and impurities) from proximal a surface of the melt, for example by comprising an interceptor. In these ways, these impurities may be removed from the melt.

Typically, dross comprises solid impurities floating on a molten metal and/or dispersed in the molten metal. Dross, being a solid, is distinguished from slag, which is a liquid. Dross forms on the surface of relatively low melting point metals such as tin, lead, zinc or aluminium or alloys thereof by oxidation of metals therein.

Lead alloys may include alloying additions as described herein, which may be thus present in the melt. Bi, Tl, In, Hg, Sb, Sn, Cd also form solid solutions with Pb and these elements may be present in the melt, as deliberate alloying additions and/or impurities. In addition, the melt may include radioactive contamination such as fissile U and/or Pu isotopes as well as radionuclides of H, C, Fe, Mn, Co, Sr and/or Ag, as described previously.

FIG. 10 shows an Ellingham diagram, showing the temperature dependence of the stability of metals and their respective oxides. Generally, the curves for most metals included in FIG. 10 are below that for the formation of PbO and thus will oxidise preferentially to Pb in the melt, thus forming dross, which may be collected. In this way, such these oxidised impurities may be removed from the melt. To promote oxidation of impurities, an oxy-lance may be used and/or chemical removal, as described below, employed.

Casting Means

The apparatus comprises the casting means for forming the second article, having the predetermined thickness, from the melt. In one example, the casting means comprises a continuous casting means. Such casting means, particularly for low melting point metal for example lead and/or an alloy thereof, for are known.

Predetermined Thickness

The formed second article has the predetermined thickness. In one example, the predetermined thickness corresponds with at most a practical detection range of β and/or γ radiation, for example for single-sided detection. In one example, the predetermined thickness corresponds with at most twice a practical detection range of β and/or γ radiation, for example for single-sided detection. In one example, a tolerance of (i.e. a variability in) the predetermined thickness is within 10%, preferable within 7.5%, more preferably within 5% of the predetermined thickness, for example across a majority (i.e. at least 50%), substantially (i.e. at least 75%, preferably at least 85%, more preferably at least 90%, most preferably at least 95%) essentially all (i.e. at least 97.5%, more preferably at least 99%, most preferably at least 99.5%) or an entirety, by width and/or by area, normal to the predetermined thickness, of the second article. That is, the thickness of the second article is relatively uniform, at least substantially uniform, at least essentially uniform or entirely uniform, respectively. In this way, measurement (i.e. detection) uncertainty is reduced since the variability in the thickness of the second article is reduced.

The attenuation of gamma or beta radiation when passing through an absorber of thickness d is expressed by the exponential law:

$$\dot{N}(d)=\dot{N}(o)\cdot e^{-\mu d}$$

where $\dot{N}(d)$ is the impulse counting rate after absorption by the absorber, $\dot{N}(o)$ is the impulse counting rate in the absence of the absorber and μ is the absorption coefficient of the absorber.

The absorption coefficient depends on three interactions of the radiation with the absorber:

a. photoelectric effect in which the primary photon interacts with an electron of the absorber such that all the photon energy of the primary photon (i.e. γ) is transferred thereto and the primary photon disappears;

b. Compton effect in which the primary photon interacts with an electron of the absorber such that the primary photon disappears and a secondary photon of lower energy appears, with the electron recoiling with the remaining energy; and c. pair production in which the primary photon interacts with a nucleus of the absorber such that the primary photon disappears and a non-preexisting positron-electron pair appear.

The relative contributions of these three interactions depends primarily on the energy of the radiation and the atomic number of the absorber. The (total) absorption coefficient μ of the absorber is given by:

$$\mu=\mu_{Ph}+\mu_{Co}+\mu_{Pa}$$

where $\mu_{Ph}$ is the absorption coefficient due to the photoelectric effect, $\mu_{Co}$ is the absorption coefficient due to the Compton effect and $\mu_{Pa}$ is the absorption coefficient due to the formation of positron-electron pairs.

FIG. 4 shows absorption of gamma rays by lead a function of energy from which it can be seen that lead is a good absorber of γ of relatively lower (i.e. <1 MeV) and relatively higher (i.e. (>10 MeV) energy.

Since the attenuation of γ takes place predominantly in the electron shells of the absorber atoms, the absorption coefficient μ is thus proportional to the number of electrons in the shell per unit volume and hence approximately proportional to the density p of the absorber. In this way, the mass attenuation coefficient μ/ρ is approximately the same for different materials, as show in Table 1.

TABLE 1

| Mass attenuation coefficient μ/ρ for different materials. | |
|---|---|
| Lead: ($\rho$ = 11.34 $gcm^{-3}$) | |
| $\mu$ = 0.62 $cm^{-1}$, | $s_\mu$ = 0.009 $cm^{-1}$, |
| $d_{1/2}$ = 1.12 cm, | $sd_{1/2}$ = 0.02 cm, |
| $\mu/\rho$ = 0.055 $cm^2g^{-1}$ | $s_{\mu/\rho}$ = 0.001 $cm^2g^{-1}$ |
| Aluminium: ($\rho$ = 2.69 $gcm^{-3}$) | |
| $\mu$ = 0.15 $cm^{-1}$, | $s_\mu$ = 0.001 $cm^{-1}$, |
| $d_{1/2}$ = 4.6 cm, | $sd_{1/2}$ = 0.3 cm, |
| $\mu/\rho$ = 0.056 $cm^2g^{-1}$ | $s_{\mu/\rho}$ = 0.004 $cm^2g^{-1}$ |
| Iron: ($\rho$ = 7.86 $gcm^{-3}$) | |
| $\mu$ = 0.394 $cm^{-1}$, | $s_\mu$ = 0.006 $cm^{-1}$, |
| $d_{1/2}$ = 1.76 cm, | $sd_{1/2}$ = 0.03 cm, |
| $\mu/\rho$ = 0.050 $cm^2g^{-1}$ | $s_{\mu/\rho}$ = 0.001 $cm^2g^{-1}$ |
| Concrete: ($\rho$ = 2.35 $gcm^{-3}$) | |
| $\mu$ = 0.124 $cm^{-1}$, | $s_\mu$ = 0.009 $cm^{-1}$, |
| $d_{1/2}$ = 5.6 cm, | $sd_{1/2}$ = 0.4 cm, |
| $\mu/\rho$ = 0.053 $cm^2g^{-1}$ | $s_{\mu/\rho}$ = 0.004 $cm^2g^{-1}$ |
| Plexiglass: ($\rho$ = 1.119 $gcm^{-3}$) | |
| $\mu$ = 0.078 $cm^{-1}$, | $s_\mu$ = 0.004 $cm^{-1}$, |
| $d_{1/2}$ = 8.9 cm, | $sd_{1/2}$ = 0.5 cm, |
| $\mu/\rho$ = 0.066 $cm^2g^{-1}$ | $s_{\mu/\rho}$ = 0.003 $cm^2g^{-1}$ |

FIG. 5 shows the impulse counting rate $\dot{N}(d)$ as a function of thickness d of the absorber for various materials, including lead. The half-value thickness $d_{1/2}$ of the absorber, as shown also in Table 1, is defined as the thickness at which the impulse counting rate is reduced by half and is given by:

$$d_{1/2}=\frac{\ln 2}{\mu}$$

In one example, the casting means is arranged to form the second article having the predetermined thickness in a range from 0.25 mm to 7.5 mm, preferably in a range from 0.5 mm to 5 mm, more preferably in a range from 1 mm to 3 mm from example 1 mm, 1.5 mm or 2 mm. That is, the second article has a relatively small thickness, such that through-thickness detection of radioactive contamination therein is practical.

Second Article

In one example, the second article is a sheet, a strip or a ribbon, preferably a continuous sheet, a continuous strip or a continuous ribbon, having no perforations therethrough as a result of the forming. In this way, the second article has a relatively small consistent thickness but a relatively long length, enabling continuous through-thickness detection of radioactive contamination, with low measurement (i.e detection) uncertainty, therein, is practical.

In one example, the casting means is arranged to form the second article at a linear rate in a range from 1 to 60 m/min, preferably in a range from 5 to 30 m/min, more preferably in a range from 10 to 20 m/min, for example 15 m/min. In this way, the second article may be formed relatively quickly, thereby providing a relatively high throughput rate.

In one example, the casting means is arranged to form the second article having a width in a range from 0.01 m to 2 m, preferably in a range from 0.1 m to 1 m, more preferably in a range from 0.25 m to 0.75 m, for example 0.4 m, 0.5 m or 0.6 m. In this way, detection of the radioactive contamination across the full width, for example, of the second article may be achieved while reducing a size and/or a number of radiation detectors required. In one example, the width of the second article is at most a width of the set of radiation detectors. In one example, the apparatus comprises a trimmer, arranged to trim a width of the second article to a predetermined width, for example at most a width of the set of radiation detectors.

In one example, the casting means comprises and/or is the rotatable roller arrangeable to contact the melt to thereby form thereon the second article and the guide arranged to remove the second article from the roller. Such casting means are known, typically for continuous casting of lead sheet for the manufacture of battery grids, which requires thin (for example <0.05 inches i.e. <1.27 mm) sheets of uniform thickness, intact (i.e. without perforations) and substantially free of dross (for example, oxide inclusions and impurities). Briefly, the outer circumference of the rotating roller, typically cooled, is at least partially immersed into the melt. A layer of molten metal (i.e. the melt) solidifies on the roller, which cools further as the roller rotates. An end of the solidified layer (i.e. the second article) is peeled off the roller, typically by hand, and the continuously formed sheet then guided over the guide. A thickness of the sheet may be controlled by controlling the speed of the rotating roller, the temperature of the molten metal and/or the depth of immersion. Typically, the depth of immersion is controlled by raising or lowering the vessel containing the molten metal into which the roller is immersed.

In one example, the apparatus comprises a second vessel arranged to receive at least a portion of the melt therein from the first vessel and wherein the apparatus comprises the roller, wherein the roller is immersible in the melt in the second vessel; optionally, wherein the apparatus comprises a pump arranged to pump the portion of the melt, directly or indirectly, from the first vessel into the second vessel. In this way, turbulence of the melt may be reduced, thereby improving uniformity of the thickness of the second article while avoiding foreign objects in the melt to be solidified on the roller. For example, the metal of the first article may be melted in the first vessel and poured, decanted or pumped into the second vessel. Foreign objects may include higher melting point metal articles that do not melt at the temperature of the melt, such as other components included with the metal of the first article to be melted. In one example, the apparatus comprises a third vessel, arranged to receive the pumped portion of the melt from the first vessel therein and arranged to flow this received portion of the melt into the second vessel. In this way, turbulence is reduced further since the melt is indirectly pumped into the second vessel.

In one example, the apparatus comprises an interceptor arranged to intercept dross on a surface of the melt. In this way, the second article is substantially freer of dross. In one example, the interceptor is arranged in the second vessel, for example between an inlet for the melt Set of Radiation Detectors The apparatus comprises the set of radiation detectors, including the first radiation detector, arranged to detect a first fraction of the radioactive contamination, if present, in a first part of a set of parts of the second article. In this way, the first fraction of the radioactive contamination, if present, may be detected in the first part and subsequently excised, as described herein.

In one example, the set of radiation detectors comprises an ionization chamber, a gaseous ionization detector, a Geiger counter and/or a scintillation counter, for example a NaI scintillation counter.

Scintillation counters (also known as scintillators) are preferred, suitable for detecting β and γ radiation. Generally, a gamma ray interacting with a scintillator produces a pulse of light that is converted to an electric pulse by a photomultiplier tube (PMT). The PMT comprises a photocathode, a focusing electrode, and 10 or more dynodes that multiply the number of electrons striking at each dynode. A chain of resistors typically located in a plug-in tube base assembly biases the anode and dynodes. Suitable NaI scintillation counters, such as 2BY2/2BY2-DD and 3BY3/3BY3-DD Integral NaI(TI) Scintillation Radiation Detector, 905 Series NaI(TI) Scintillation Radiation Detectors and/or Lanthanum Bromide Scintillation Radiation Detectors are available from ANTECH (A. N. Technology Limited, UK; ANTECH Corporation, USA).

Gaseous ionization detectors, such as gas flow proportional counters, are suitable for detecting α radiation and may be included additionally.

In one example, the set of radiation detectors comprises opposed first and second radiation detectors arranged to receive the second article traversing therebetween. By having opposed first and second radiation detectors, the predetermined thickness may be increased, for example doubled, compared with detecting from only one side of the second article. Additionally and/or alternatively, detection uncertainty may be reduced due to dual, for example synchronised, detection using the opposed first and second radiation detectors. Since, in use, the second article moves (i.e. traverses) between the opposed first and second radiation detectors, for example intermittently or preferably continuously, during the detection, a rate of detection and hence processing of the first article may be increased. In one example, the opposed first and second radiation detectors are mutually offset, for example laterally, to optimise detection. In one example, the set of radiation detectors is calibrated, for example using gamma ray point sources of either Cs-137 or Co-60.

Conveyor

In one example, the apparatus comprises a conveyor arranged to convey the second article past the set of radiation detectors. In this way, detection is of the moving second article, conveyed on the conveyor. In one example, the conveyor is arranged to convey the second article past the set of radiation detectors at a linear rate in a range from 1 to 60 m/min, preferably in a range from 5 to 30 m/min, more preferably in a range from 10 to 20 m/min, for example 15 m/min. In one preferred example, the conveyor is arranged to convey the second article past the set of radiation detectors at a same rate as a rate of forming of the second article. In this way, the rate of detecting matched the rate of forming the second article.

Cutter

The apparatus comprises the cutter arrangeable to excise the first part of the second article therefrom. In this way, the first part of the second article including the detected first fraction of the radioactive contamination is physically removed from the second article. In one example, the cutter comprises and/or is a mechanical cutter, for example a punch, a nibbler or shears, arranged to cut around the detected first fraction of the radioactive contamination. By mechanically cutting the second article, rather than thermally cutting or melting, metal vapours are avoided while control of disposal of the first part of the second article is facilitated. In one example, the apparatus comprises a receptacle arranged to receive the excised first part of the second article therein, for example for disposal according to required procedures. In one example, the cutter is arranged to cut a predetermined shape, for example a circle, a rectangle, a square or a triangle. In one example, the cutter is arranged to cut a variable shape, for example according to a shape of the detected first fraction.

In one example, the set of radiation detectors is arranged to detect the first fraction of the radioactive contamination, if present, across at least 90% of a width of the second article, preferably at least 95% of the width of the second article, more preferably 100% of the width of the second article. In this way, presence of the radioactive contamination may be detected in substantially all or all of the second article.

In one example, the set of radiation detectors is arranged to detect a second fraction of the radioactive contamination, if present, in a second part of the set of parts of the second article and wherein the cutter is arrangeable to excise the second part of the second article therefrom. In this way, a plurality of parts of the second article may be excised.

In one example, the apparatus is arranged to control the cutter to excise the first part of the second article therefrom in response to a signal received from the set of radiation detectors. In this way, the cutter may be synchronised with the set of radiation detectors, arranged upstream therefrom. In one example, the signal corresponds with and/or comprises a first location of the first fraction of the radioactive contamination in the second article and the apparatus is arranged to control the cutter to excise the first part of the second article therefrom according to the first location, for example centred about the first location. The excised first part may include a margin around the first location, for example according to a spatial resolution of the set of detectors.

Spooling

In one example, the apparatus comprises a rotatable barrel arranged to receive the second article, having the first part excised therefrom, spooled thereon. In this way, the spooled second article may be readily transported and/or stored, for example for recycling.

Enclosure

In one example, the apparatus comprises an enclosure, arranged to enclose a part or the whole apparatus. In one preferred example, the enclosure comprises and/or is an intermodal freight container (also known colloquially as a shipping container), such as a 20' (~6 m) or a 40' (~12 m) intermodal freight container. In this way, the apparatus may be readily stored, transported and/or installed, using standard storage, transportation and/or lifting means, thereby reducing cost and/or complexity. In one example, the enclosure comprises a set of wheels. In this way, transportation of the apparatus is facilitated. In one example, the enclosure comprises a set of lifting lugs or points for a lifting bridle and/or a set of forklift pockets. In one example, the enclosure comprises air and/or gas extraction and/or purification.

Method

The second aspect provides a method of removing radioactive contamination, at least in part, from a first article comprising a metal, preferably wherein the metal comprises and/or is a low melting point metal for example lead and/or an alloy thereof, the method comprising:

melting the metal, at least in part, thereby providing a melt therefrom;

forming a second article, for example a sheet, a strip or a ribbon, having a predetermined thickness, from the melt, preferably by contacting the melt with a rotating roller and removing therefrom the second article formed thereon;

detecting a first fraction of the radioactive contamination, if present, in a first part of a set of parts of the second article, preferably using a set of radiation detectors, including a first radiation detector, preferably by receiving the second article traversing between opposed first and second radiation detectors of the set of radiation detectors; and excising the detected first fraction of the radioactive contamination, if present, from the second article, for example by cutting, the first part of the second article therefrom.

The radioactive contamination, the first article, the metal, the lead, the alloy thereof, the melt, the second article, the forming thereof, the sheet, the strip, the ribbon, the predetermined thickness, the roller, the first fraction, the first part, the set of parts, the set of radiation detectors, the first radiation detector, the opposed first and second radiation detectors, the excising and/or the cutting may be as described with respect to the first aspect.

In one example, the method does not include chemical removal of the radioactive contamination, for example by chemical reaction of the radioactive contamination, such as by oxidation treatment to remove Fe, Co and/or As, chloride treatment to remove Ca, Mg, Na, Mn, Be, Cr, W, V, Ti and/or Sn, sulphide treatment to remove Sr, Ca, Mg, Zn, Mn, Co, Bi, Ti and/or Sn, zinc treatment to remove Ag. Rather, the temperature of the melt is relatively low, for example below usual temperatures for removing radioactive contamination by chemical reaction. In this way, problems associated with chemical removal of the radioactive contamination are reduced and/or avoided, for example because the temperature of the melt is relatively lower.

In one example, the forming the second article is at a linear rate in a range from 1 to 60 m/min, preferably in a range from 5 to 30 m/min, more preferably in a range from 10 to 20 m/min.

In one example, the forming the second article comprises forming the second article having the predetermined thickness in a range from 0.25 mm to 7.5 mm, preferably in a range from 0.5 mm to 5 mm, more preferably in a range from 1 mm to 3 mm from example 1 mm, 1.5 mm or 2 mm.

In one example, the forming the second article comprises forming the second article having a width in a range from 0.01 m to 2 m, preferably in a range from 0.1 m to 1 m, more preferably in a range from 0.25 m to 0.75 m, for example 0.4 m, 0.5 m or 0.6 m.

In one example, the detecting a first fraction of the radioactive contamination is by using the set of radiation detectors comprising an ionization chamber, a gaseous ionization detector, a Geiger counter and/or a scintillation counter.

In one example, the detecting a first fraction of the radioactive contamination comprises detecting a first fraction of the radioactive contamination across at least 90% of a width of the second article, preferably at least 95% of the width of the second article, more preferably 100% of the width of the second article.

In one example, the detecting a second fraction of the radioactive contamination, if present, in a second part of the set of parts of the second article and excising the detected second fraction of the radioactive contamination, if present, from the second article, for example by cutting, the second part of the second article therefrom.

In one example, the excising the detected first fraction of the radioactive contamination, if present, from the second article comprises excising the first part of the second article therefrom responsive to a signal received from the set of radiation detectors.

In one example, the method comprises conveying the second article while detecting a first fraction of the radioactive contamination.

In one example, the method comprises forming the second article from the melt is by contacting the melt with a rotating roller, wherein the method comprises stilling the melt.

In one example, the method comprises intercepting dross on a surface of the melt.

In one example, the method comprises spooling the second article, having the first part excised therefrom, on a rotatable barrel.

In one example, the method comprises controlling a speed of forming of the second article.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 7:
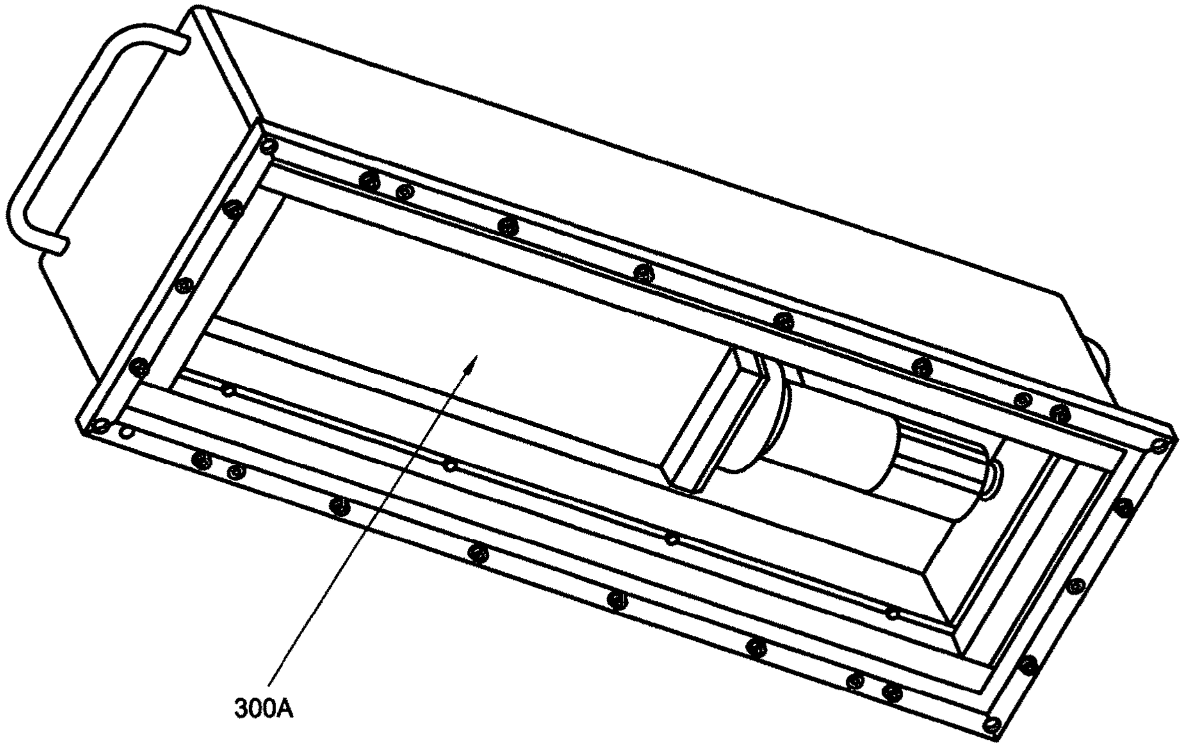
FIG. 7 schematically depicts a part of the apparatus of FIG. 6, in more detail.

FIG. 7 schematically depicts an apparatus 10 according to an exemplary embodiment.

The apparatus 10 is for removing radioactive contamination, at least in part, from a first article A1 (not shown, in this example, used Pb—4 wt. % Sb shielding bricks) comprising a metal, preferably wherein the metal comprises and/or is a low melting point metal for example lead and/or an alloy thereof. The apparatus 10 comprises a heated first vessel 100A for melting the metal, at least in part, therein, thereby providing a melt M therefrom. The apparatus 10 comprises casting means 200 for forming a second article A2, particularly a sheet, having a predetermined thickness T, from the melt, preferably wherein the casting means 200 comprises and/or is a rotatable roller 210 arrangeable to contact the melt M to thereby form thereon the second article A2 and a guide 220 arranged to remove the second article A2 from the roller 210. The apparatus 10 comprises a set of radiation detectors 300, including a first radiation detector 300A, arranged to detect a first fraction of the radioactive contamination, if present, in a first part P1 of a set of parts of the second article A2, preferably wherein the set of radiation detectors 300 comprises opposed first and second radiation detectors 300A, 300B arranged to receive the second article A2 traversing therebetween. The apparatus 10 comprises a cutter 400 arrangeable to excise the first part P1 of the second article A2 therefrom.

In this example, the metal comprises Pb in an amount of at about 95 wt. %, for Pb—4 wt. % Sb shielding bricks.

In this example, the metal has a melting point of about 280° C. In this example, the first vessel 100A is heated using gas burners. In this example, the heated first vessel 100A is arranged to heat the metal to a temperature of about 380° C.

In this example, the heated first vessel 100A has a capacity in of 0.4 $m^3$.

In this example, the apparatus 10 is arranged to drain a heel (i.e. heavy impurities) from the bottom of the melt M in the first vessel 100A, for example by comprising an outlet (not shown) proximal the base thereof. In this example, the apparatus 10 is arranged to collect dross (i.e. light impurities) from proximal a surface of the melt, for example by comprising an interceptor 110.

The apparatus 10 comprises the casting means 200 for forming the second article A2, having the predetermined thickness T, from the melt. In this example, the casting means 200 comprises a continuous casting means 200.

The formed second article A2 has the predetermined thickness T. In this example, the predetermined thickness T corresponds with at most twice a practical detection range of β and/or γ radiation, for example for single-sided detection. In this example, the casting means 200 is arranged to form the second article A2 having the predetermined thickness T in a range of 2 mm. In this example, the second article A2 is a continuous sheet. In this example, a tolerance of (i.e. a variability in) the predetermined thickness is within 10% of the predetermined thickness across at least 75% by area, normal to the predetermined thickness, of the second article A2. In this example, the casting means 200 is arranged to form the second article A2 at a linear rate in a range of 15 m/min. In this example, the casting means 200 is arranged to form the second article A2 having a width of 0.4 m.

In this example, the casting means 200 comprises the rotatable roller 210 arrangeable to contact the melt M to thereby form thereon the second article A2 and the guide 220 arranged to remove the second article A2 from the roller 210. In this example, the apparatus 10 comprises a second vessel 100B arranged to receive at least a portion of the melt M therein from the first vessel 100A and wherein the apparatus 10 comprises the roller 210, wherein the roller 210 is immersible in the melt M in the second vessel 1006; wherein the apparatus 10 comprises a pump (not shown) arranged to pump the portion of the melt, directly or indirectly, from the first vessel 100A into the second vessel 1006. In this example, the apparatus 10 comprises an interceptor 110 arranged to intercept dross on a surface of the melt.

In this example, the set of radiation detectors 300 comprises 4 off 16"×4"×2" NaI scintillation counters. In this example, the set of radiation detectors 300 comprises opposed first and second radiation detectors 300A, 300B arranged to receive the second article A2 traversing therebetween. Particularly, two NaI scintillation counters are arranged below the second article A2 and two NaI scintillation counters are arranged above the second article A2. In this example, the opposed first and second radiation detectors 300A, 300B are mutually offset laterally to optimise detection. In this example, the set of radiation detectors 300 is calibrated using gamma ray point sources of either Cs-137 or Co-60.

In this example, the apparatus 10 comprises a conveyor 500 arranged to convey the second article A2 past the set of radiation detectors 300. In this example, the conveyor 500 is arranged to convey the second article A2 past the set of radiation detectors 300 at a linear rate in a range from 10 to 20 m/min, for example 15 m/min. In this example, the conveyor 500 is arranged to convey the second article A2 past the set of radiation detectors 300 at a same rate as a rate of forming of the second article A2. In this way, the rate of detecting matched the rate of forming the second article A2.

In this example, the cutter 400 comprises and/or is a mechanical cutter 400, for example a punch, arranged to cut around the detected first fraction of the radioactive contamination. In this example, the cutter 400 is arranged to cut a predetermined shape, for example a circle.

In this example, the set of radiation detectors 300 is arranged to detect the first fraction of the radioactive contamination, if present, across 100% of the width of the second article A2.

In this example, the set of radiation detectors 300 is arranged to detect a second fraction of the radioactive contamination, if present, in a second part of the set of parts of the second article A2 and wherein the cutter 400 is arrangeable to excise the second part of the second article A2 therefrom.

In this example, the apparatus 10 is arranged to control the cutter 400 to excise the first part P1 of the second article A2 therefrom in response to a signal received from the set of radiation detectors 300. In this example, the signal corresponds with and/or comprises a first location of the first fraction of the radioactive contamination in the second article A2 and the apparatus 10 is arranged to control the cutter 400 to excise the first part P1 of the second article A2 therefrom according to the first location, for example centred about the first location.

In this example, the apparatus 10 comprises a rotatable barrel 600 arranged to receive the second article A2, having the first part P1 excised therefrom, spooled thereon.

Figure 1:
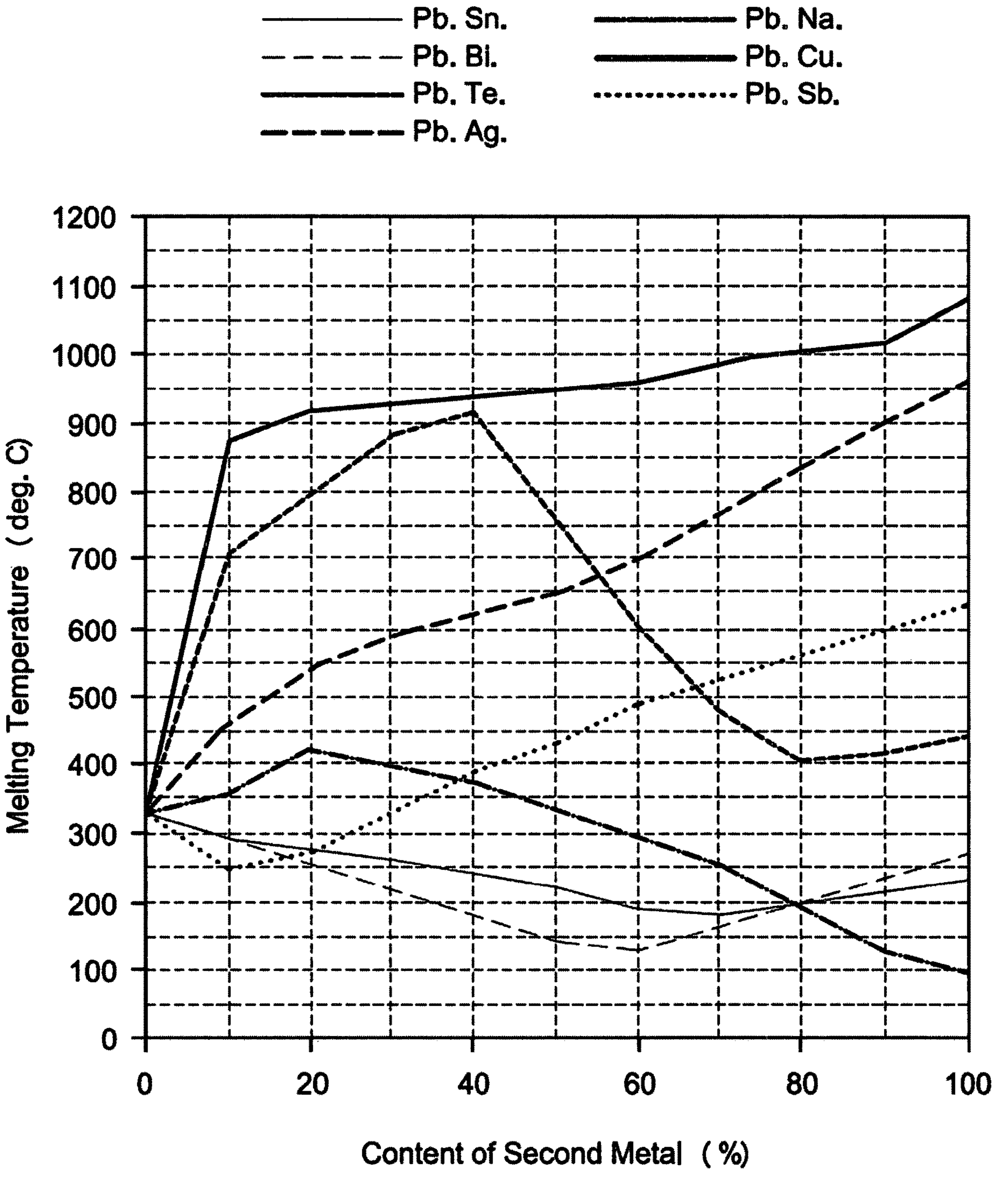
FIG. 1 shows the melting point of binary Pb alloys as a function of the content of alloying additions of Sn, Bi, Te, Ag, Na, Cu and Sb.
Figure 2:
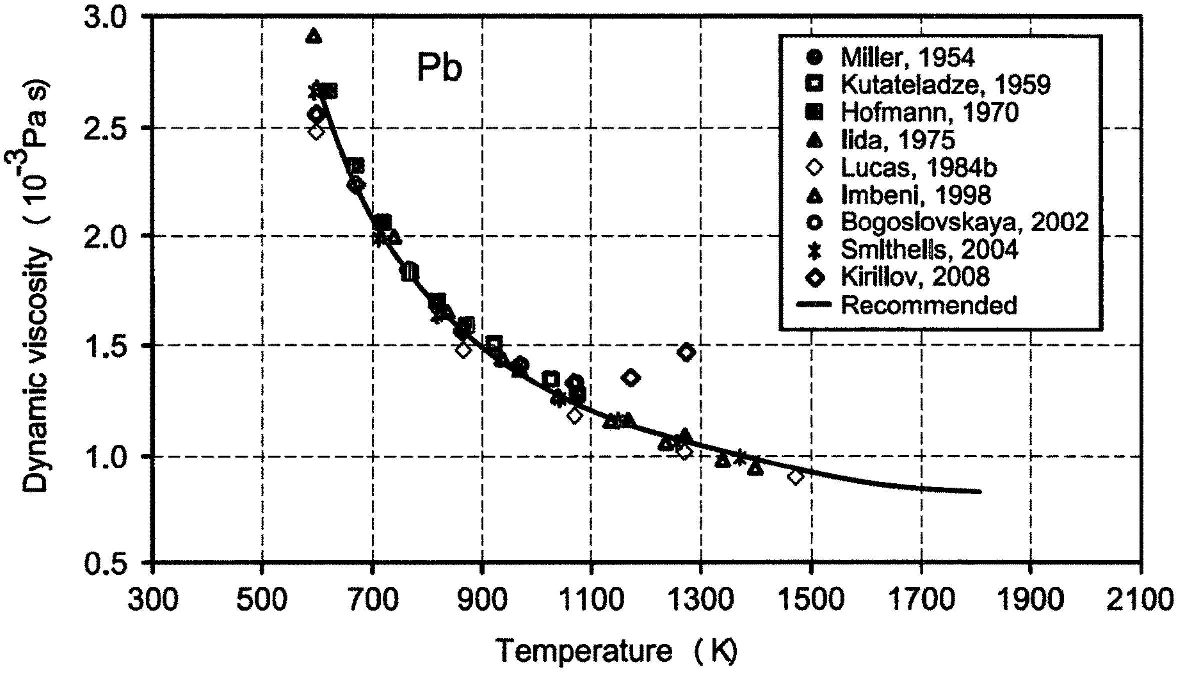
FIG. 2 shows the dynamic viscosity $\eta_{Pb}$ of technically pure liquid lead as a function of temperature.
Figure 3:
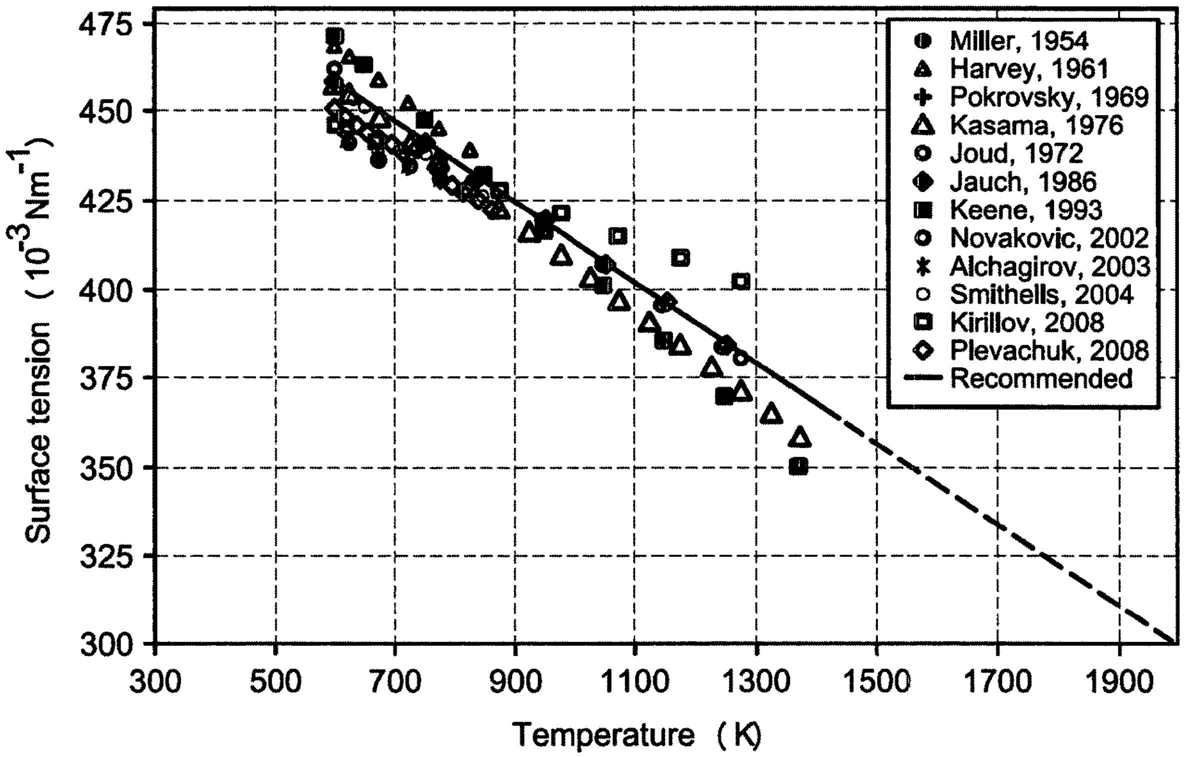
FIG. 3 shows the surface tension of liquid lead as a function of temperature.
Figure 4:
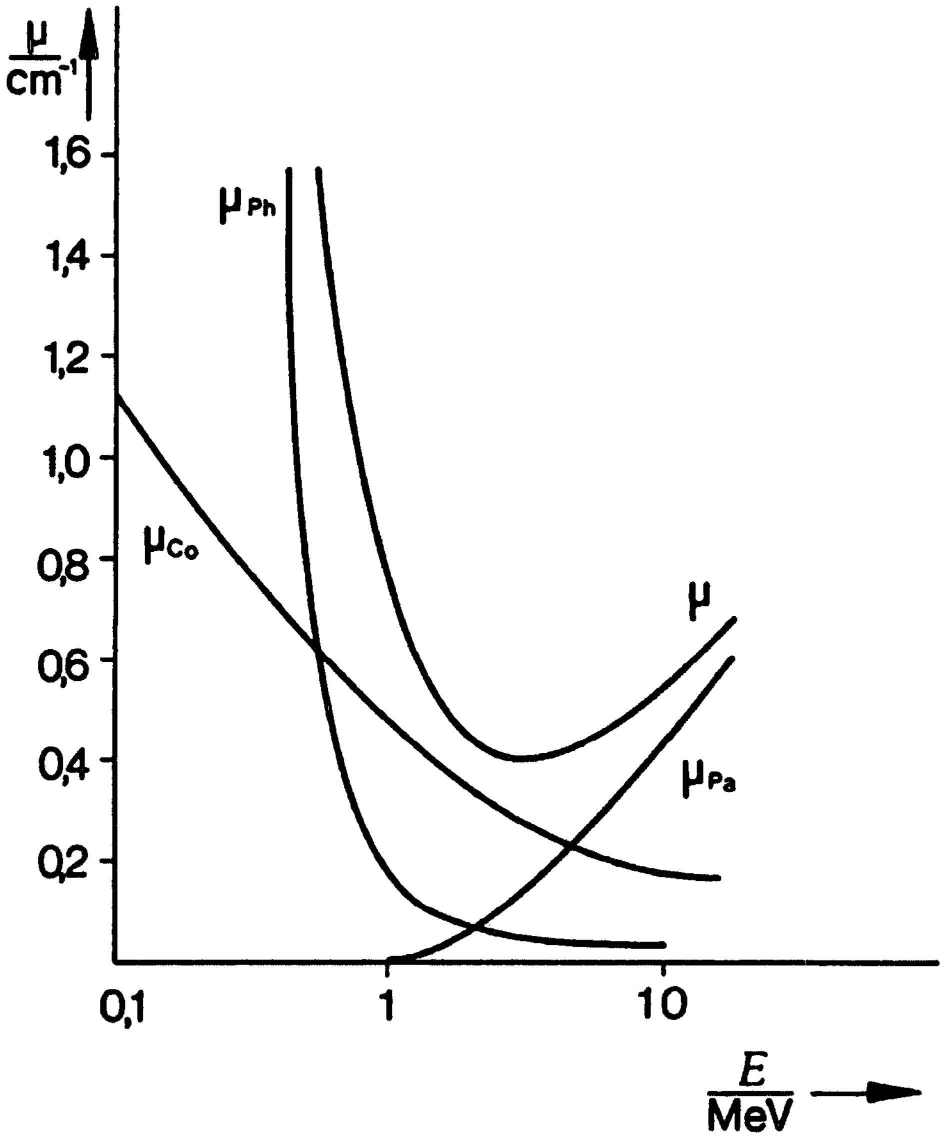
FIG. 4 shows absorption of gamma rays by lead a function of energy.
Figure 5:
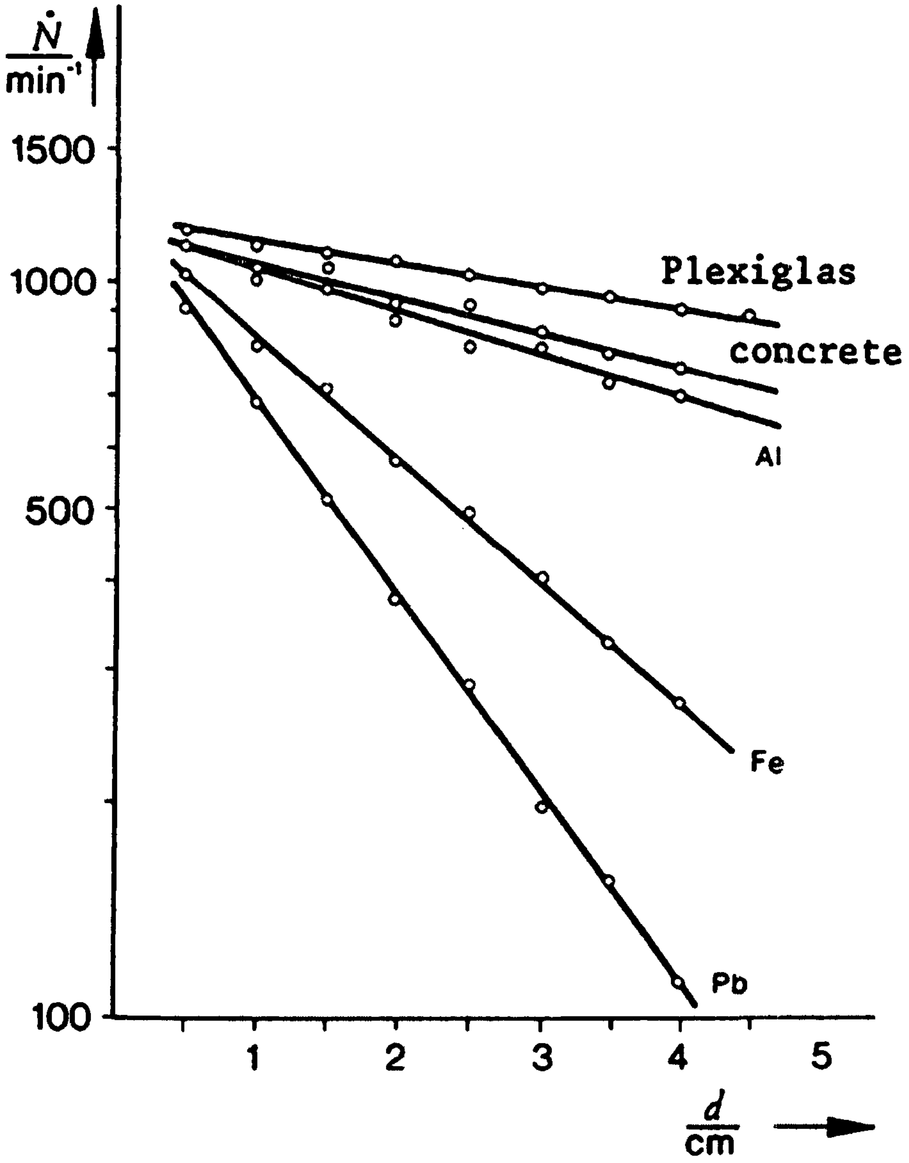
FIG. 5 shows the impulse counting rate $\dot{N}(d)$ as a function of thickness d.
Figure 6:
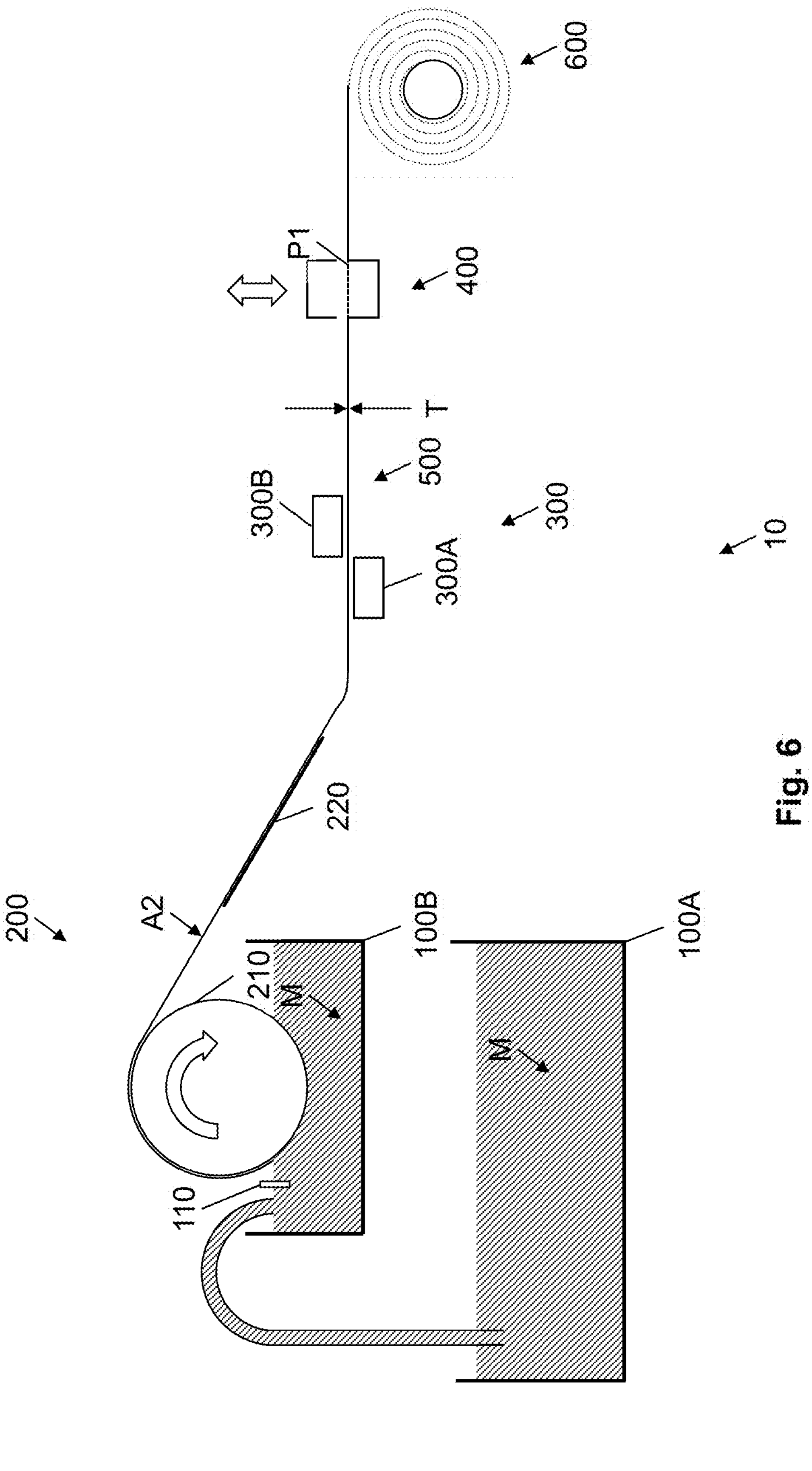
FIG. 6 schematically depicts an apparatus according to an exemplary embodiment.

FIG. 7 schematically depicts a part of the apparatus 10 of FIG. 6, in more detail. Particularly, FIG. 7 shows an underneath perspective view of the first radiation detector 300A, part number 8D16X64A5 3.5 available from ANTECH, housed in a housing.

Figure 8:
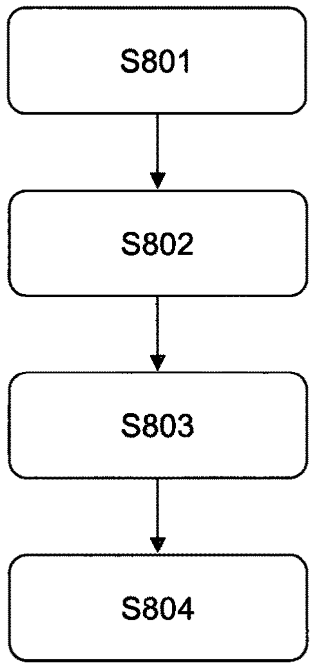
FIG. 8 schematically depicts a method according to an exemplary embodiment.

FIG. 8 schematically depicts a method according to an exemplary embodiment.

The method is of removing radioactive contamination, at least in part, from a first article comprising a metal, preferably wherein the metal comprises and/or is a low melting point metal for example lead and/or an alloy thereof.

At S801, the metal is melted, at least in part, thereby providing a melt therefrom.

At S802, a second article, for example a sheet, a strip or a ribbon, having a predetermined thickness, is formed from the melt, preferably by contacting the melt with a rotating roller and removing therefrom the second article formed thereon.

At S803, a first fraction of the radioactive contamination, if present, is detected in a first part of a set of parts of the second article, preferably using a set of radiation detectors, including a first radiation detector, preferably by receiving the second article traversing between opposed first and second radiation detectors of the set of radiation detectors.

At S804, the detected first fraction of the radioactive contamination, if present, is excised from the second article, for example by cutting, the first part of the second article therefrom.

The method may include any of the steps described herein.

Figure 9:
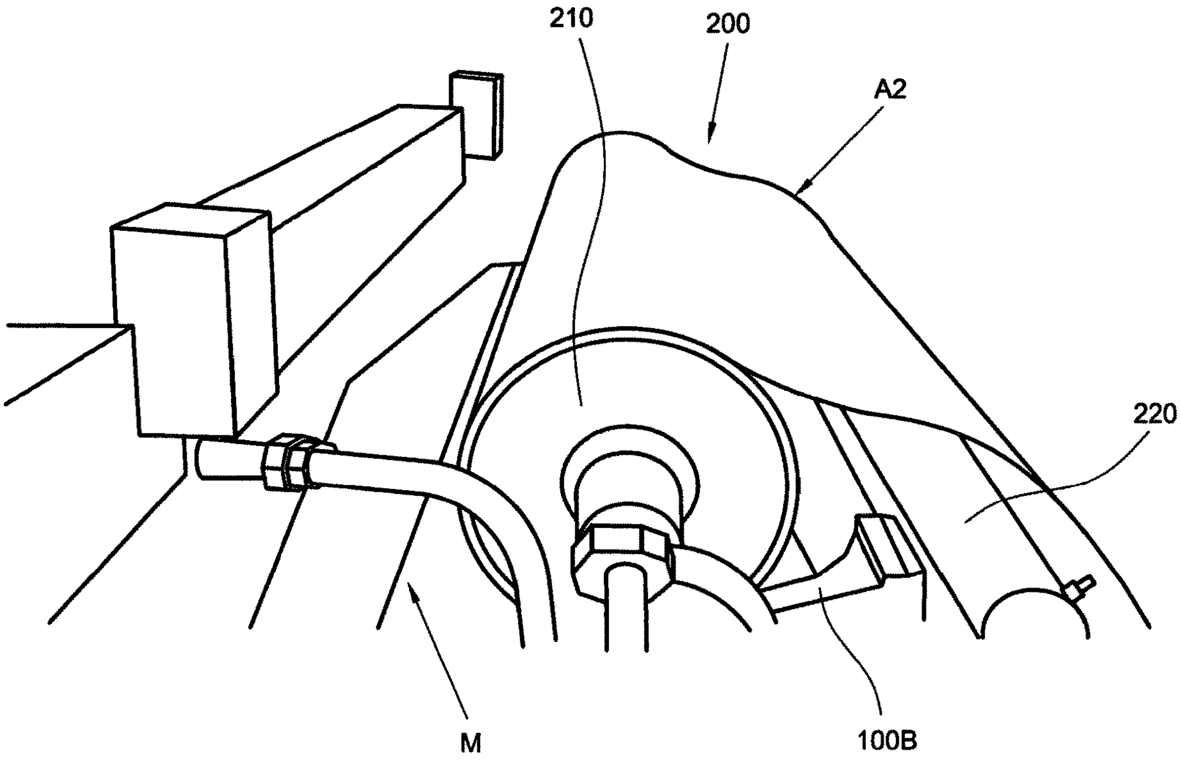
FIG. 9 shows a photograph of forming a second article.
Figure 10:
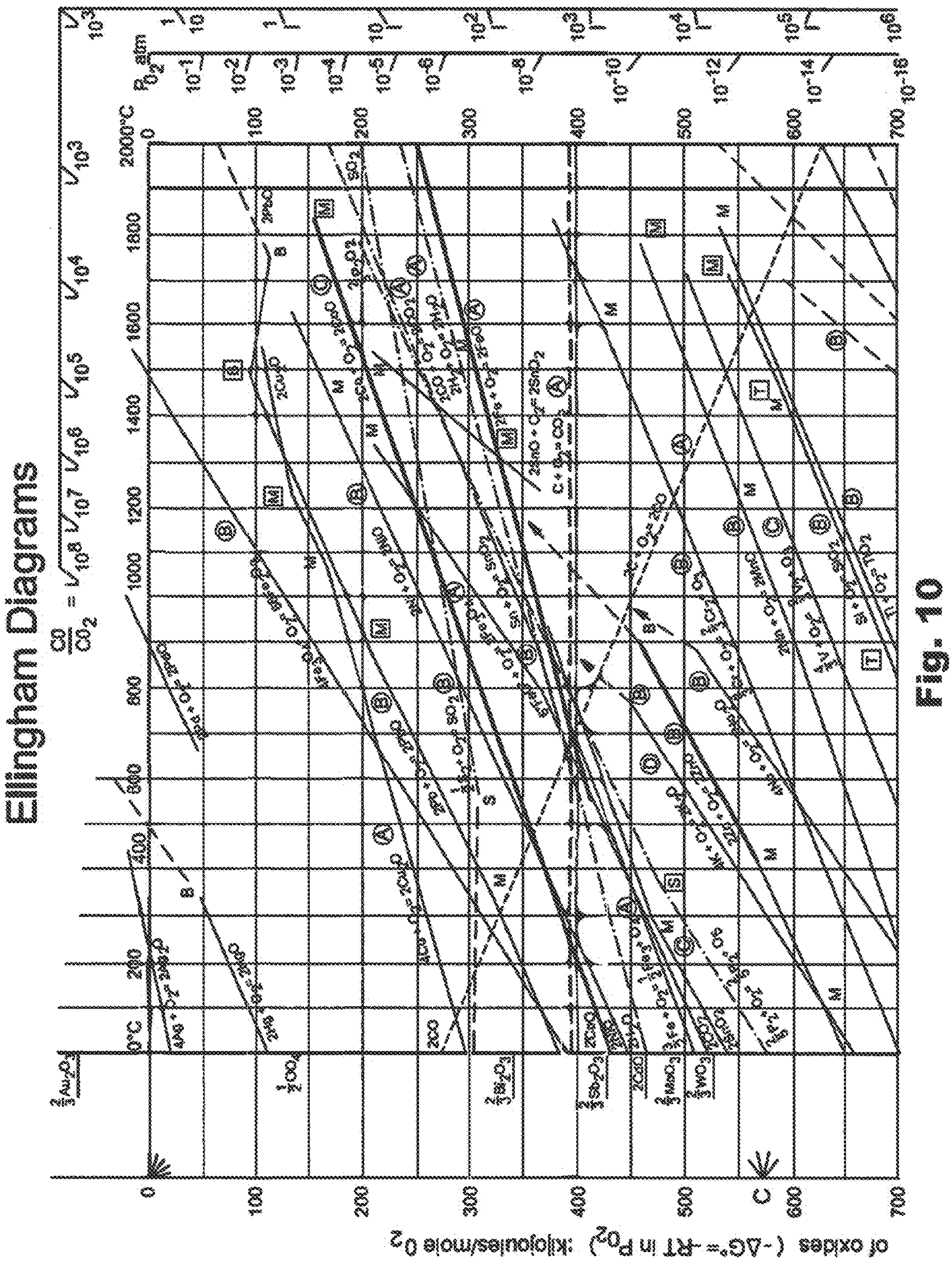
FIG. 10 shows an Ellingham diagram.
Figure 10:
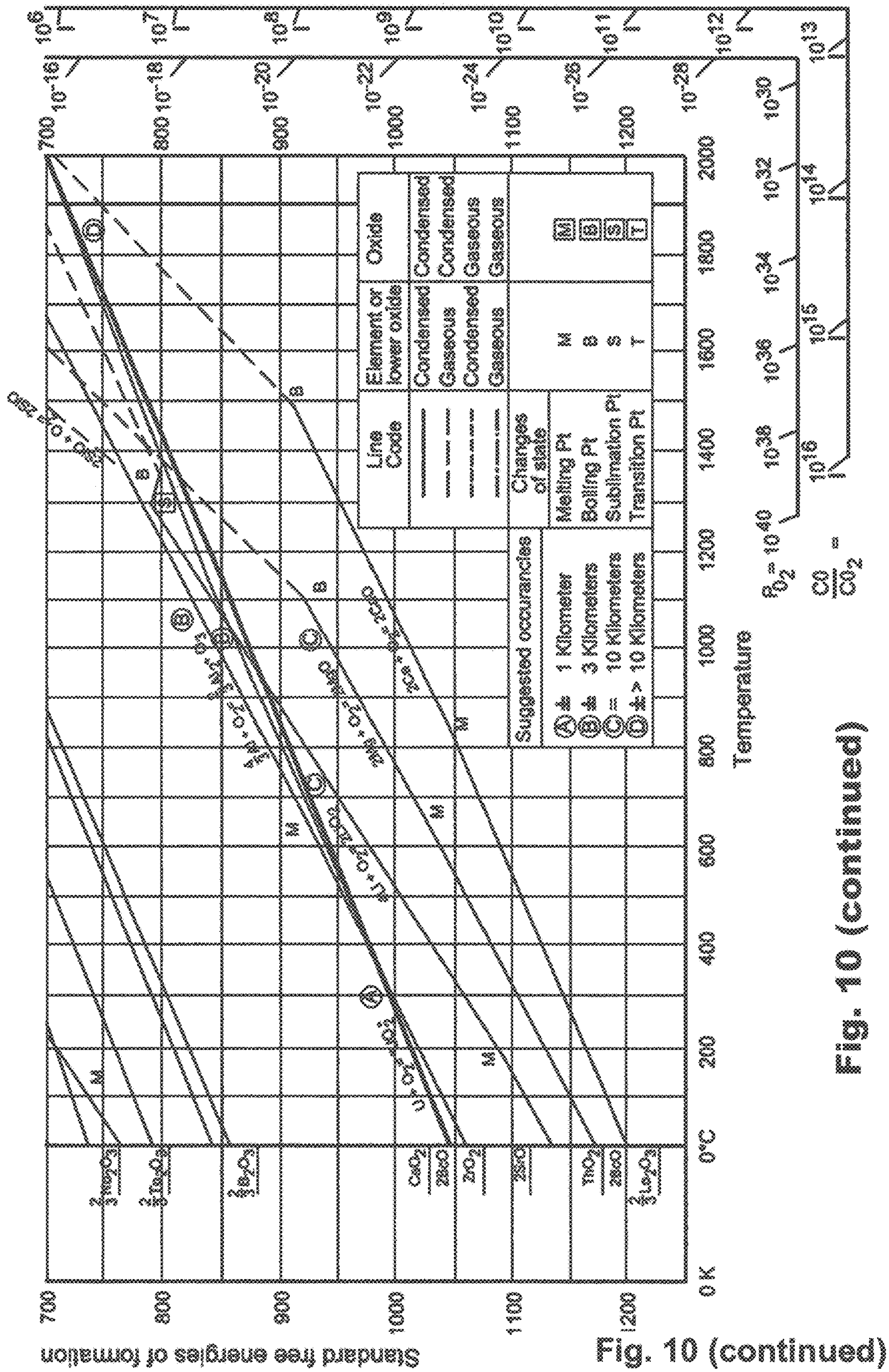

FIG. 9 shows a photograph of forming a second article A2, using the casting means 200.

Although a preferred embodiment has been shown and described, it will be appreciated by those skilled in the art that various changes and modifications might be made without departing from the scope of the invention, as defined in the appended claims and as described above.

In summary, the invention provides an apparatus for, and a method of, removing radioactive contamination from a first article comprising a metal, preferably wherein the metal comprises and/or is a low melting point metal for example lead and/or an alloy thereof. In this way, the low melting point metal of the first article is formed into the second article, having the predetermined thickness (i.e. a controlled dimension). The pre-determined thickness allows through-thickness (i.e. volumetric) detection of the first fraction of the radioactive contamination, if present. In contrast, through-thickness detection of radioactive contamination therein is generally not possible. Hence, by melting the metal and forming the second article therefrom, the radioactive contamination that was internal and undetectable in the first article is now detectable in the second article, by virtue of the predetermined thickness thereof. If the first fraction of the radioactive contamination is detected, the first part of the second article, including the first fraction of the radioactive contamination, is excised, such that the remaining part of the second article has proportionately less radioactive contamination. Hence, by detecting and excising the fractions of the radioactive contamination present in the second article, the residual radioactive contamination therein is reduced.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An apparatus for removing radioactive contamination, at least in part, from a first article comprising a metal, the apparatus comprising: a heated first vessel for melting the metal, at least in part, therein, thereby providing a melt therefrom; a casting means for forming a second article from the melt, wherein the casting means comprises a rotatable roller arrangeable to contact the melt to thereby form thereon the second article and a guide arranged to remove the second article from the roller; a first radiation detector, arranged to detect a first fraction of the radioactive contamination, if present, in a first part of a set of parts of the second article, and a cutter arrangeable to excise the first part of the second article therefrom.

2. The apparatus according to claim 1, wherein the casting means is arranged to form the second article at a linear rate in a range from 1 to 60 m/min.

3. The apparatus according to claim 1, wherein the casting means is arranged to form the second article having the predetermined thickness in a range from 0.25 mm to 7.5 mm.

4. The apparatus according to claim 1, wherein the casting means is arranged to form the second article having a width in a range from 0.01 m to 2 m.

5. The apparatus according to claim 1, wherein the first radiation detector comprises an ionization chamber, a gaseous ionization detector, a Geiger counter and/or a scintillation counter.

6. The apparatus according to claim 1, wherein the first radiation detector is arranged to detect a first fraction of the radioactive contamination, if present, across at least 90% of a width of the second article.

7. The apparatus according to claim 1, wherein the first radiation detector is arranged to detect a second fraction of the radioactive contamination, if present, in a second part of the set of parts of the second article and wherein the cutter is arrangeable to excise the second part of the second article therefrom.

8. The apparatus according to claim 1, wherein the apparatus is arranged to control the cutter to excise the first part of the second article therefrom in response to a signal received from the first radiation detector; optionally wherein the signal corresponds with a first location of the first fraction of the radioactive contamination in the second article and the apparatus is arranged to control the cutter to excise the first part of the second article therefrom according to the first location.

9. The apparatus according to claim 1, comprising a conveyor arranged to convey the second article past the first radiation detector.

10. The apparatus according to claim 1, comprising a second vessel arranged to receive at least a portion of the melt therein from the first vessel and wherein the apparatus comprises the roller, wherein the roller is immersible in the melt in the second vessel; optionally, wherein the apparatus comprises a pump arranged to pump the portion of the melt from the first vessel into the second vessel.

11. The apparatus according to claim 1, comprising an interceptor arranged to intercept dross on a surface of the melt.

12. The apparatus according to claim 1, comprising a rotatable barrel arranged to receive the second article, having the first part excised therefrom, spooled thereon.

* * * * *